(12) United States Patent
Jingu

(10) Patent No.: US 6,196,185 B1
(45) Date of Patent: Mar. 6, 2001

(54) FUEL DIRECT INJECTION SPARK IGNITION TYPE INTERNAL COMBUSTION ENGINE

(75) Inventor: Nobuhisa Jingu, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/215,249

(22) Filed: Dec. 18, 1998

(30) Foreign Application Priority Data

Dec. 18, 1997 (JP) ..................................................... 9-349073

(51) Int. Cl.7 ................................. F02B 3/02; F02B 31/08
(52) U.S. Cl. ..................................... 123/302; 123/41.82 R
(58) Field of Search ................................... 123/302, 308, 123/432, 41.82 R, 301

(56) References Cited

U.S. PATENT DOCUMENTS 4,958,604 * 9/1990 Hashimoyo ........................... 123/302
5,894,826 * 4/1999 Jaye ...................................... 123/301

FOREIGN PATENT DOCUMENTS

| 197 13 030 A1 | 10/1997 | (DE) . |
| 0 173 296 A2 | 3/1986 | (EP) . |
| 0 235 121 A1 | 9/1987 | (EP) . |
| 0 554 235 A1 | 8/1993 | (EP) . |
| 0 601 612 A1 | 6/1994 | (EP) . |
| 6-101588 | 4/1994 | (JP) . |
| 9-119344 | 5/1997 | (JP) . |
| 9-209760 * | 8/1997 | (JP) . |

* cited by examiner

*Primary Examiner*—Andrew M. Dolinar
(74) *Attorney, Agent, or Firm*—Foley & Lardner

(57) ABSTRACT

In a cylinder head of a fuel direct injection spark ignition type internal combustion engine, there extend a pair of intake ports to a combustion chamber. The intake ports are arranged to decrease a distance therebetween as nearing the combustion chamber. An axial center line of each intake port is inclined by an angle "$\theta$" relative to an imaginary plane which includes a center line of an associated piston and is perpendicular to an axial line of an associated crankshaft. The angle "$\theta$" satisfies the inequality of "$0° < \theta \leq 15°$". If desired, the imaginary plane may be replaced with another imaginary plane which includes a center line of an associated fuel injector and extends in parallel with the center line of the associated piston.

7 Claims, 5 Drawing Sheets

FUEL DIRECT INJECTION SPARK IGNITION TYPE INTERNAL COMBUSTION ENGINE

BACKGROUND OF THE INVENTION

1. Field of the Invention

The present invention relates in general to internal combustion engines and more particularly to the internal combustion engines of a fuel direct injection spark ignition type that adapts a system for injecting fuel directly into the combustion chamber and igniting the air/fuel mixture in the chamber using a spark produced by a spark plug. More specifically, the present invention is concerned in an arrangement of intake ports formed in a cylinder head of such engines.

2. Description of the Prior Art

In providing a cylinder head of an internal combustion engine with two intake ports for each combustion chamber, it has been commonly employed that, due to the inherent separation from a single intake passage, the two intake ports are arranged to extend in parallel or extend while increasing a distance therebetween as nearing the combustion chamber.

Particularly, in the internal combustion engines of the above-mentioned type, it has been commonly employed that a fuel injector is arranged below and between the two intake ports, that is, at a peripheral side of the combustion chamber. This arrangement is shown in for example Japanese Patent First Provisional Publication 9-119344.

In this Publication, there is also disclosed a cooling water passage formed in the cylinder head near a lower portion of a fuel injector mounting bore. With this, a fuel injector installed in the mounting bore and fuel fed to the fuel injector are cooled during operation of the engine.

Beside, in Japanese Patent First Provisional Publication 6-101588, there is disclosed a system for suppressing overheating of fuel injected by the fuel injector. That is, in the system, a return part of the fuel from the fuel injector is controlled in accordance with the temperature of the fuel fed to the fuel injector.

SUMMARY OF THE INVENTION

However, the arrangements disclosed by the above-mentioned publications have failed to exhibit satisfied performances due to the following reasons.

That is, the above-mentioned parallel and/or non-parallel arrangement of the two intake ports tend to induce an air flow dispersion in the combustion chamber. In this case, it is difficult to create a satisfied tumble air flow in the center of the cylinder, so that a fuel injected from the fuel injector in the compression stroke under a stratified charge combustion is not assuredly conveyed to the ignition plug and furthermore the fuel injected from the fuel injector in the intake stroke under a homogeneous charge combustion fails to produce a sufficiently homogeneous charge due to inadequate collision against the tumble flow.

Furthermore, the cooling measure and system disclosed by the publications have failed to exhibit a satisfied performance due to their inherent constructions. That is, in the cooling measure disclosed by the Publication 9-119344, a sufficient cooling of the fuel is not achieved. In the cooling system of the Publication 6-101588, a fuel temperature sensor and a complicated control unit are needed, which causes increase in cost of the system.

Thus, it is an object of the present invention to provide a fuel direct injection spark ignition type internal combustion engine which is free of the drawbacks possessed by the above-mentioned conventional engines.

According to a first aspect of the present invention, there is provided a fuel direct injection spark ignition type internal combustion engine, which comprises a combustion chamber; and a pair of intake ports extending to the combustion chamber. The intake ports are arranged to decrease a distance therebetween as nearing the combustion chamber. An axial center line of each intake port is inclined by an angle "$\theta$" relative to an imaginary plane which includes a center line of an associated piston and is perpendicular to an axial line of an associated crankshaft. The angle "$\theta$" satisfies the inequality of "$0° < \theta \leq 15°$".

According to a second aspect of the present invention, there is provided a fuel direct injection spark ignition type internal combustion engine, which comprises a combustion chamber; and a pair of intake ports extending to the combustion chamber. The intake ports are arranged to decrease a distance therebetween as nearing the combustion chamber. An axial center line of each intake port is inclined by an angle "$\theta$" relative to an imaginary plane which includes a center line of an associated fuel injector and extends in parallel with a center line of an associated piston. The angle "$\theta$" satisfies the inequality of "$0° < \theta \leq 15°$".

DETAILED DESCRIPTION OF THE INVENTION

Figure 1:
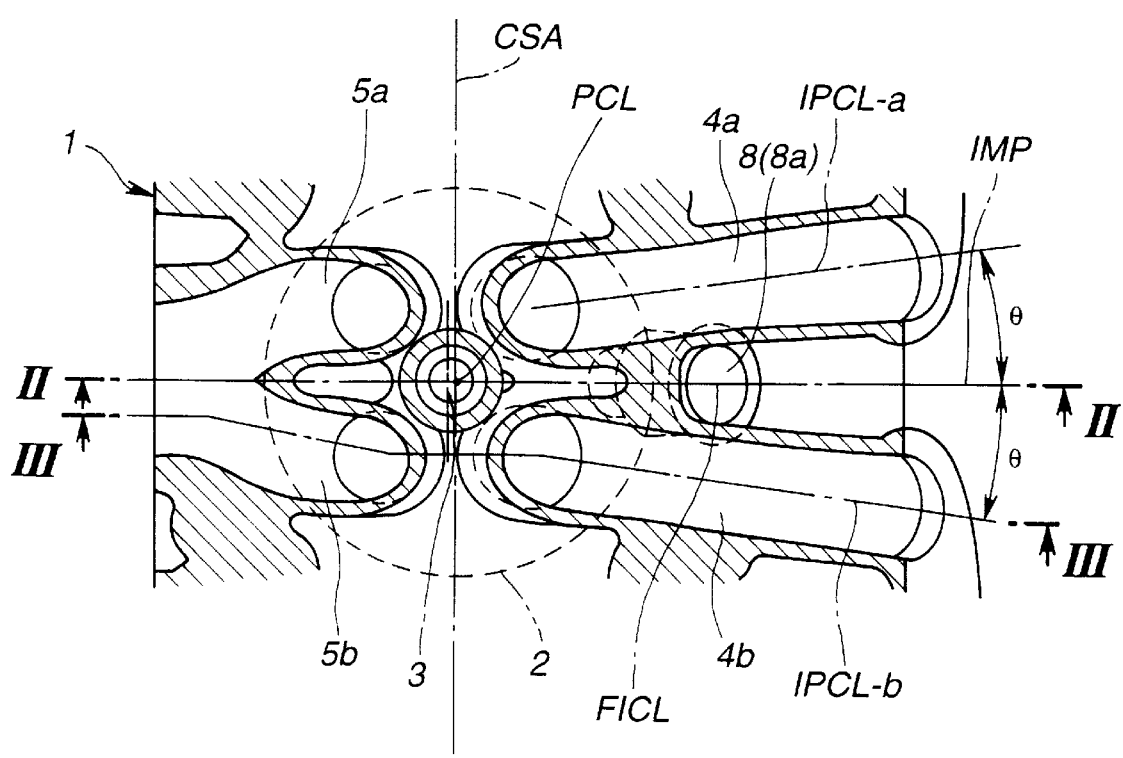
FIG. 1 is a horizontally sectional view of a cylinder head employed in an internal combustion engine according to the present invention.
Figure 2:
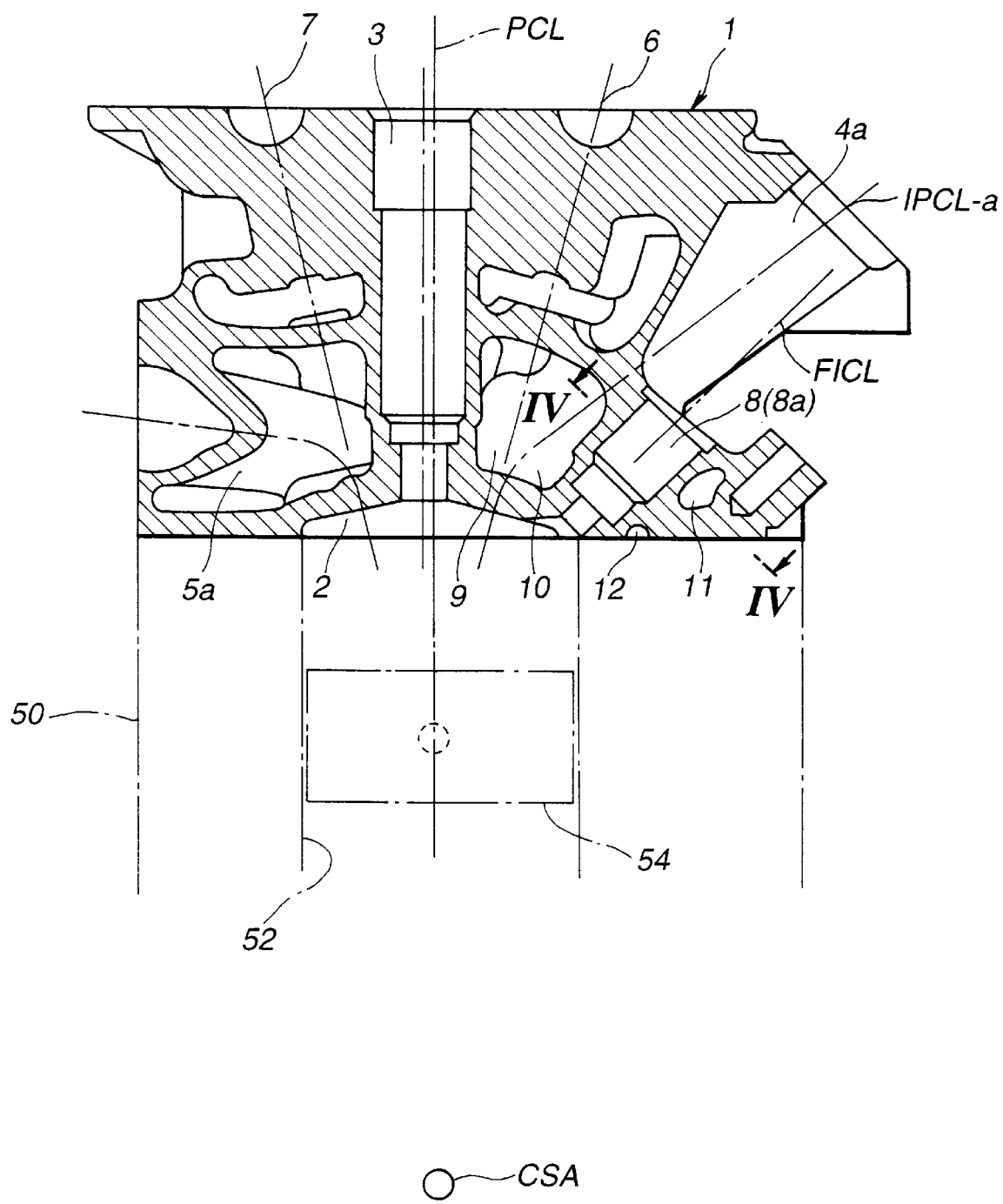
FIG. 2 is a sectional view taken along the line II—II of FIG. 1.

Referring to FIGS. 1 to 6, particularly FIGS. 1 and 2, there is shown a cylinder head 1 employed in an internal combustion engine according to the present invention.

The engine is of the fuel direct injection spark ignition type that adapts a system for injecting fuel directly into the combustion chamber and igniting the air/fuel mixture in the chamber using a spark produced by a spark plug.

As is seen from FIG. 2, the cylinder head 1 is formed at its lower surface with a recess by which part of a combustion chamber 2 is defined. The cylinder head 1 is mounted on an upper surface of a cylinder block 50. The cylinder block 50 has a cylinder 52 in which a piston 54 is operatively installed. Denoted by reference "CSA" is an axial line (or axis) of an associated crankshaft.

The cylinder head 1 is formed with an ignition plug mounting bore 3 that penetrates to a generally center part of the combustion chamber 2. Although not shown in the drawings, an ignition plug is tightly disposed in the bore 3 having its spark producing point exposed to the combustion chamber 2.

As is seen from FIG. 1, the cylinder head 1 is formed with two intake ports 4a and 4b and two exhaust ports 5a and 5b, which extend toward and from the combustion chamber 2 respectively. These intake and exhaust ports 4a, 4b, 5a and 5b have respective openings (no numerals) exposed to the combustion chamber 2 and are arranged to surround the ignition plug mounting bore 3. Although not shown in the drawings, intake and exhaust valves are operatively mounted to the intake and exhaust ports 4a, 4b, 5a and 5b respectively.

Figure 3:
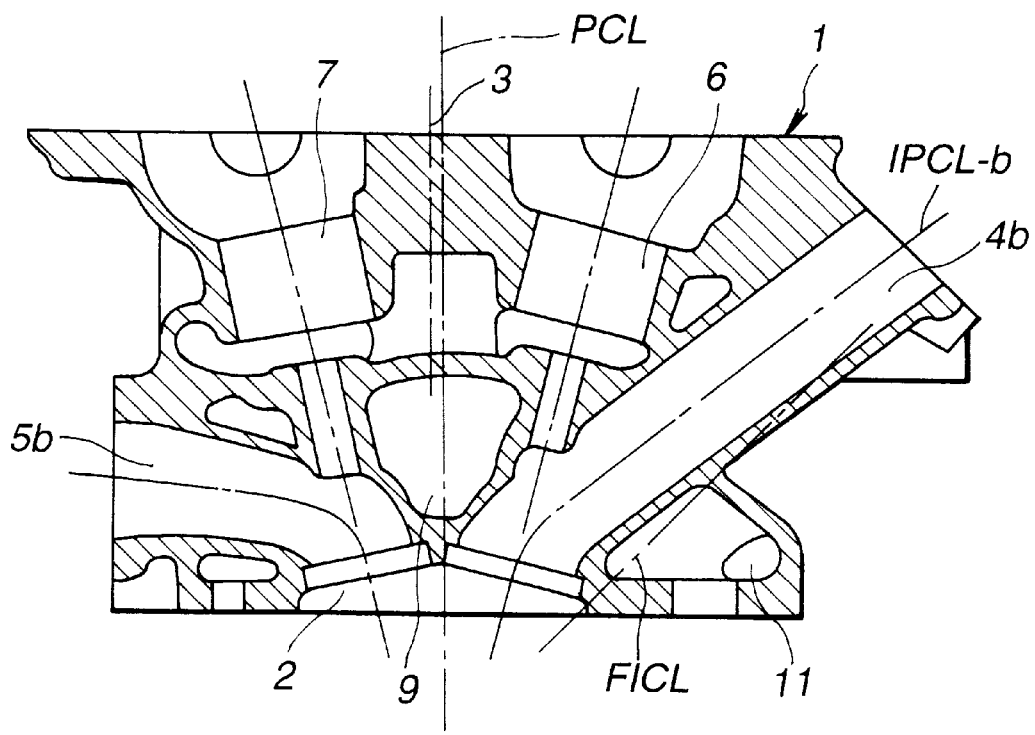
FIG. 3 is a sectional view taken along the line III—III of FIG. 1.

In FIG. 3, there are shown respective mounting bores 6 and 7 for the intake and exhaust valves.

As is seen from FIGS. 1 and 2, the cylinder head 1 is formed below and between the two intake ports 4a and 4b with a fuel injector mounting bore 8 that penetrates to a peripheral end of the combustion chamber 2. As is seen from FIG. 2, a fuel injector 8a is tightly disposed in the bore 8 having its nozzle exposed to the combustion chamber 2. That is, fuel is directly injected into the combustion chamber 2.

As is seen from FIG. 1, in the present invention, the two intake ports 4a and 4b are arranged to approach each other as nearing the combustion chamber 2. More specifically, the two intake ports 4a and 4b are arranged to satisfy the following geometric conditions.

That is, with decrease of a distance from the combustion chamber 2, an axial center line "IPCL-a or IPCL-b" of each intake port 4a or 4b gradually decreases a distance from an imaginary plane "IMP" which includes a center line "PCL" (see FIGS. 2 and 3) of an associated piston (not shown) and is perpendicular to the axial line "CSA" of the associated crankshaft. In the illustrated embodiment, a center line "FICL" of the fuel injector 8a is included in the imaginary plane "IMP". The center line "FICL" passes through the nozzle of the fuel injector 8a.

In FIG. 1, an angle defined between the axial center line "IPCL-a or IPCL-b" and the imaginary plane "IMP" is denoted by reference "θ". As will be described in detail hereinafter, the angle "θ" is greater than 0 (zero) degree and not greater than 15 degrees, preferably, not smaller than 5 degrees and not greater than 10 degrees. That is, inequality "0°<θ≦15°", preferably, "5°<θ≦10°", is established.

With the above-mentioned converging arrangement of the two intake ports 4a and 4b, air flowing in the intake ports 4a and 4b can be directed to a central portion of the cylinder and thus the tumble air flow can be enhanced. Accordingly, under the stratified charge combustion wherein fuel injection is carried out in the compression stroke, the fuel injected from the fuel injector 8a can be assuredly conveyed to the ignition plug, and under the homogeneous charge combustion wherein the fuel injection is carried out in the intake stroke, the fuel injected from the fuel injector 8a can produce a sufficiently homogeneous charge due to adequate collision against the tumble air flow.

Due to the angled arrangement between the two intake ports 4a and 4b, the fuel injector mounting bore 8 can be easily provided in the cylinder head 1. As will be described hereinafter, due to the same reason, various cooling water passages for the fuel injector 8a can be easily provided in the cylinder head 1.

In the following, the detail of the angle "θ" between the axial center line "IPCL-a or IPCL-b" and the imaginary plane "IMP" will be described with reference to FIG. 5.

Figure 5:
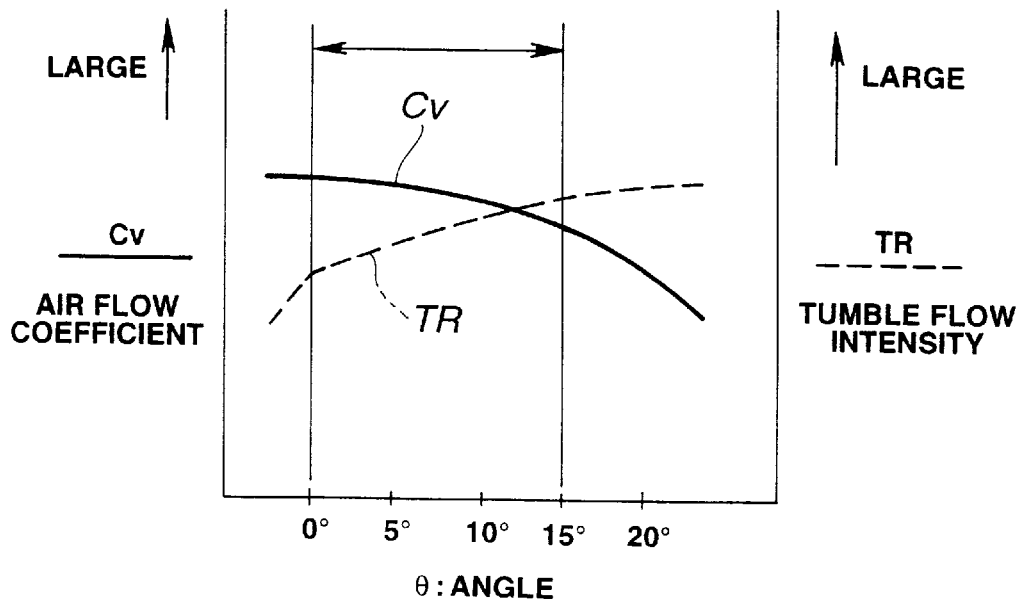
FIG. 5 is a graph depicting an appropriate range of an angle "$\theta$" of each intake port relative to a predetermined imaginary plane.

FIG. 5 is a graph depicting a relationship (solid curve) between the angle "θ" and an air flow coefficient "Cv" and a relationship (dotted curve) between the angle "θ" and a tumble flow intensity "TR". As is seen from this graph, the tumble flow intensity "TR" increases with increase of the angle "O", while, the 20 air flow coefficient "Cv" decreases with increase of the angle "θ". However, when the angle "θ" satisfies the "0°<θ≦15°" (Preferably, "5°<θ≦10°"), both the air flow coefficient (viz., air charging efficiency) and the tumble flow intensity exhibit satisfied values.

From the aerodynamic point of view, it is preferable to equalize the angle "θ" between the axial center line "IPCL-a" and the imaginary plane "IMP" with the angle "θ" between the axial center line "IPCL-b" and the imaginary plane "IMP". However, if desired, that is, if a different type of air flow in the combustion chamber 2 is needed, the two angles "θ" and "θ" may be differed from each other subject to satisfying the condition of "0°<θ≦15°".

As is seen from FIG. 2, the cylinder head 1 is formed near the fuel injector mounting bore 8 with a plurality of cooling water passages, which are an upper cooling water passage 9, a first lower cooling water passage 11 and a second lower cooling water passage 12. Due to provision of these passages 9, 11 and 12, the fuel injector 8a installed in the bore 8 is effectively cooled during operation of the engine. These passages can be easily provided in the cylinder head 1 due to the above-mentioned angled arrangement of the two intake ports 4a and 4b.

Figure 4:
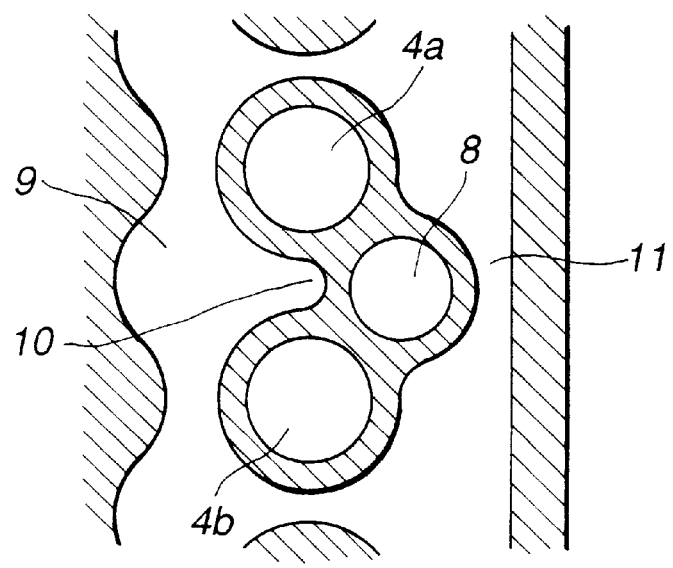
FIG. 4 is a sectional view taken along the line IV—IV of FIG. 2.

As is seen from FIG. 4, the upper cooling water passage 9 has an extended part 10 which is placed between and above the two intake ports 4a and 4b. That is, the part 10 is positioned near the fuel injector mounting bore 8 to cool the fuel injector 8a.

The part 10 is produced by providing a core sand for the cylinder 1 with a portion corresponding to the part 10.

The first and second cooling water passages 11 and 12 are positioned below the fuel injector mounting bore 8. More specifically, the first lower passage 11 extends axially (that is, in a direction parallel with the axial line "CSA" of the crankshaft) in the vicinity of a lower portion of the mounting bore 8. This passage 11 is produced by providing the core sand with another portion corresponding to the passage 11.

The second lower cooling water passage 12 is formed on a lower surface of the cylinder head 1, which extends axially in the vicinity of the lower portion of the bore 8. This second lower passage 12 is produced by providing a sandmold for the cylinder head 1 with a portion corresponding to the passage 12.

In the following, the detail of the upper and lower cooling water passages 11 and 12 will be described with reference to FIG. 6.

Each of the passages 11 and 12 has at a position just below the fuel injector mounting bore 8 a minimum sectional area ranging from 0.1 cm² to 2.5 cm². More specifically, each passage 11 or 12 has such a minimum sectional area at a given portion through which the above-mentioned imaginary plane "IMP" passes. In other words, the portions of the passages 11 and 12 actually illustrated by FIG. 2 have such minimum sectional areas.

Figure 6:
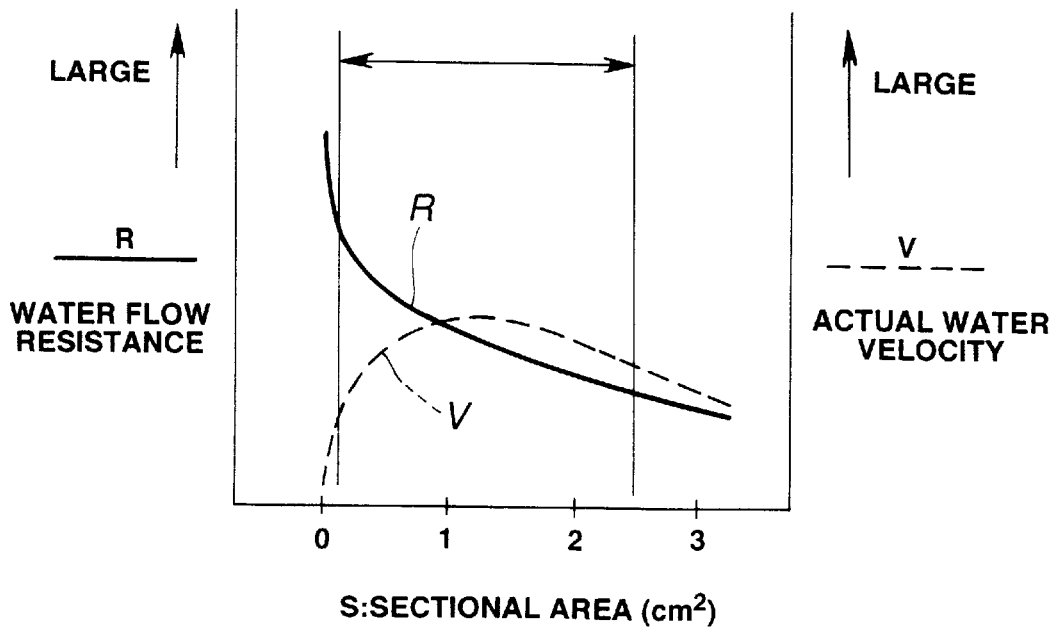
FIG. 6 is a graph depicting an appropriate range of a sectional area of a given part of each of first and second cooling passages.

FIG. 6 is a graph depicting a relationship (solid curve) between the sectional area "S" and a water flow resistance "R" and a relationship (dotted curve) between the sectional area "S" and an actual water velocity "V". As is seen from this graph, the water flow resistance "R" decreases with increase of the sectional area "S", while, the actual water velocity "V" increases as the sectional area "S" increases to about 1.3 cm², but decreases thereafter. However, when the sectional area "S" is within the range from 0.1 cm² to 2.5 cm², both the water flow resistance "R" and the actual water velocity "V" exhibit satisfied values. That is, within this range, sufficient flow of cooling water is obtained in the passages 11 and 12.

Due to advantageous layout taken by the first water passage 11, the sectional area of the given portion of this water flow passage 11 may range from 0.5 cm² to 2.5 cm². While, due to inherently disadvantageous layout taken by the second water passage 12, the sectional area of the given portion of this passage 12 may range from 0.1 cm² to 1.0 cm².

With the cooling water passages 10, 11 and 12, the fuel injector 8a installed in the fuel injector mounting bore 8 is effectively cooled and thus performance lowering of the fuel injector 8a which would be caused by overheating is assuredly suppressed.

Figure 7:
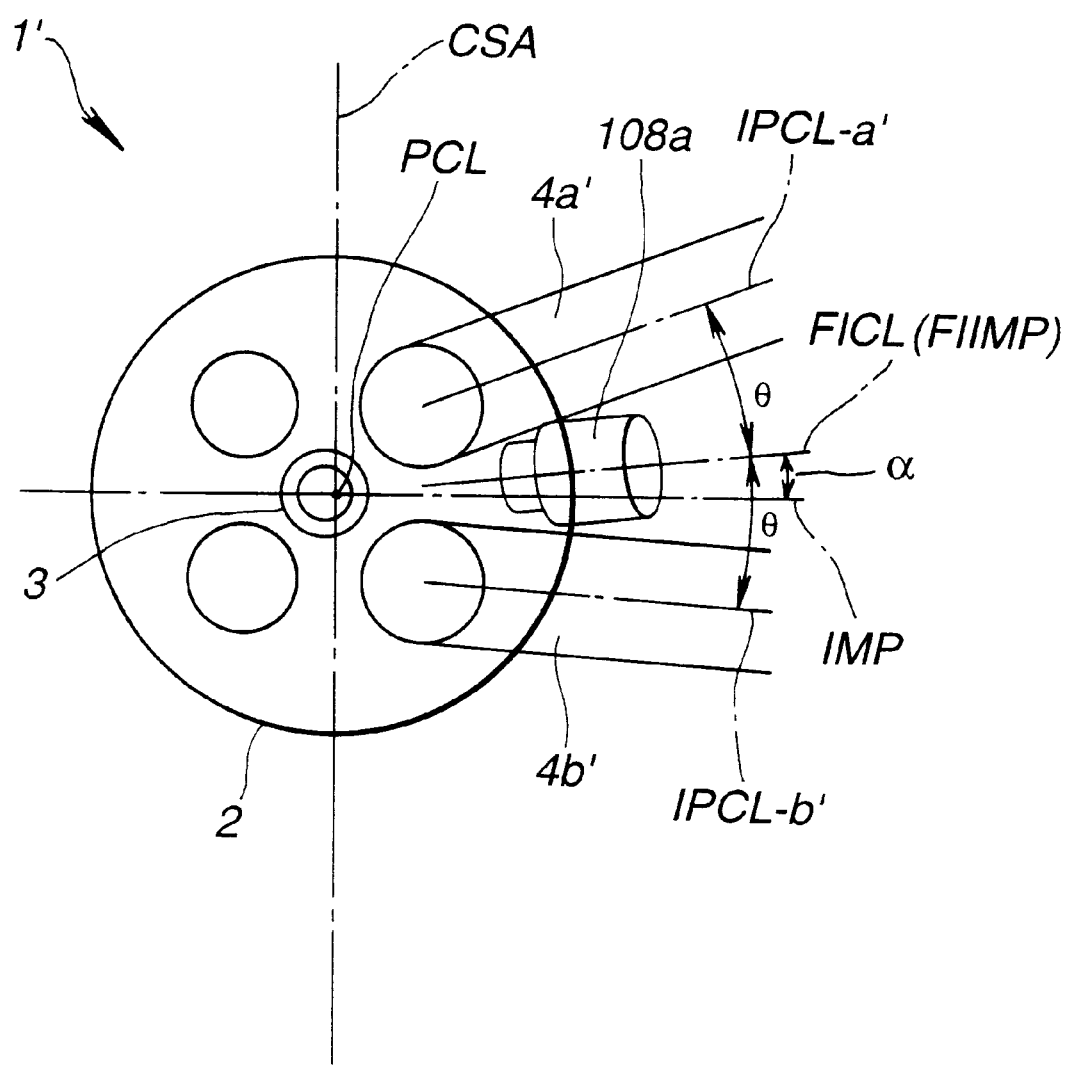
FIG. 7 is a view similar to FIG. 1, but showing a modified cylinder head employable in the engine of the present invention.

Referring to FIG. 7, there is shown a modified cylinder head 1' employable in the internal combustion engine according to the present invention.

In the modification, the center line "FICL" of the fuel injector 108a is not included in the imaginary plane "IMP", that is, the center line "FICL" is inclined relative to the imaginary plane "IMP" by an angle "α". Furthermore, with decrease of a distance from the combustion chamber 2, the axial center line "IPCL-a' or IPCL-b'" of each intake port 4a' or 4b' gradually decreases a distance from an imaginary plane "FIIMP" which includes the injector center line "FICL" and is inclined relative to the imaginary plane by the angle "α". Each axial center line "IPCL-a' or IPCL-b'" is thus inclined by "θ" relative to the imaginary plane "FIIMP". It has been found that also in this modification, satisfied performance is obtained like in the above-mentioned arrangement.

If desired, the two angles "θ" and "θ" may be differed from each other subject to satisfying the condition of "0°<θ≦15°".

The contents of Japanese Patent Application 9-349073 filed Dec. 18, 1997 are hereby incorporated by reference.

What is claimed is:

1. A fuel direct injection spark ignition type internal combustion engine, comprising:

a combustion chamber; and a pair of intake ports extending to said combustion chamber, said intake ports decreasing a distance therebetween as nearing said combustion chamber, each of said intake ports having an axial center line that is inclined by an angle "θ" relative to a first imaginary plane that includes a center line of an associated fuel injector and extends in parallel with a center line of an associated piston, said angle "θ" satisfying the inequality of "0°<θ<15°", wherein the fuel injector is spaced from the center line of the associated piston, and wherein said first imaginary plane is inclined at an angle "a" to a second imaginary plane that includes the center line of the associated piston and is perpendicular to an axial line of an associated crankshaft.

2. A fuel direct injection spark ignition type internal combustion engine, comprising:

a combustion chamber; and a pair of intake ports extending to said combustion chamber, said intake ports decreasing a distance therebetween as nearing said combustion chamber, wherein each of said intake ports having an axial center line that is inclined by an angle "θ" relative to a first imaginary plane that includes a center line of an associated fuel injector and extends in parallel with a center line of an associated piston, said angle "θ" satisfying the inequality of "0°<74 <15°".

wherein said first imaginary plane is inclined at an angle "α" to a second imaginary plane that includes the center line of the associated piston and is perpendicular to an axial line of an associated crankshaft, wherein said angle "θ" satisfies the inequality of "5°<θ<10°".

3. A fuel direct injection spark ignition type internal combustion engine, comprising:

a combustion chamber;

a pair of intake ports extending to said combustion chamber, said intake ports decreasing a distance therebetween as nearing said combustion chamber, wherein each of said intake ports having an axial center line that is inclined by an angle "θ" relative to a first imaginary plane that includes a center line of an associated fuel injector and extends in parallel with a center line of an associated piston, said angle "θ" satisfying the inequality of "0°<θ<15°", wherein said first imaginary plane is inclined at an angle "α" to a second imaginary plane that includes the center line of the associated piston and is perpendicular to an axial line of an associated crankshaft, and a first lower cooling water passage and a second lower water cooling passage that are located near a fuel injector mounting bore containing the associated fuel injector.

4. A fuel direct injection spark ignition type internal combustion engine as claimed in claim 3, wherein said first lower cooling water passage is positioned below said fuel injector mounting bore and extends in a direction parallel to said axial line of the associated crankshaft, and wherein said second lower cooling water passage is positioned below the fuel injector and extends in a direction parallel to said axial line of the associated crankshaft, said second lower cooling water passage being formed on a lower surface of a cylinder head to which an upper surface of a cylinder block is attached.

5. A fuel direct injection spark ignition type internal combustion engine as claimed in claim 3, wherein one of the first lower cooling water passage and the second lower cooling water passage has a sectional area ranging from 0.1 cm² to 2.5 cm².

6. A fuel direct injection spark ignition type internal combustion engine as claimed in claim 3, wherein said first lower cooling water passage has, at a position just below said fuel injector mounting bore, a sectional area ranging from 0.5 cm² to 2.5 cm².

7. A fuel direct injection spark ignition type internal combustion engine as claimed in claim 3, wherein said second lower cooling water passage has a sectional area ranging from 0.1 cm² to 1.0 cm².

* * * * *